United States Patent [19]
Urbach et al.

[11] Patent Number: 5,678,947
[45] Date of Patent: Oct. 21, 1997

[54] JOINT ASSEMBLY

[75] Inventors: Brian A. Urbach, Rochester Hills; Frank J. Struss, Livonia, both of Mich.

[73] Assignee: TRW Inc., Lyndhurst, Ohio

[21] Appl. No.: 533,734

[22] Filed: Sep. 26, 1995

[51] Int. Cl.$^6$ .............................. F16C 11/06; F16J 15/32
[52] U.S. Cl. ..................... 403/288; 403/134; 403/122; 277/168
[58] Field of Search ......................... 403/288, 122, 403/134; 277/168, 169, 172

[56] References Cited

U.S. PATENT DOCUMENTS

| | | | |
|---|---|---|---|
| 1,036,032 | 8/1912 | Tree | 277/168 |
| 2,664,029 | 12/1953 | Higgins | |
| 2,889,183 | 6/1959 | Peras | 277/169 |
| 3,007,720 | 11/1961 | Breitenstein | |
| 3,273,923 | 9/1966 | Ulderup | |
| 3,588,201 | 6/1971 | Schmidt | 277/169 X |
| 3,753,584 | 8/1973 | Kindel et al. | |
| 4,230,415 | 10/1980 | Scheerer | 403/122 |
| 5,066,159 | 11/1991 | Urbach | |
| 5,152,628 | 10/1992 | Broszat et al. | |

FOREIGN PATENT DOCUMENTS

| | | | |
|---|---|---|---|
| 167781 | 7/1986 | Japan | 277/168 |
| 1303779 | 4/1987 | U.S.S.R. | 277/168 |
| 2100337 | 12/1982 | United Kingdom | 403/122 |

*Primary Examiner*—Anthony Knight
*Attorney, Agent, or Firm*—Tarolli, Sundheim, Covell, Tummino & Szabo

[57] ABSTRACT

An improved joint assembly includes a housing (12) and movable member (24) having a ball end portion (26) which is disposed in the housing. An annular seal (42) is disposed between an inner side surface (16) of the housing (12) and the ball end portion (26) of the movable member (24). The annular seal (42) has bilateral symmetry about a central plane (46) extending perpendicular to a central axis (38) of the annular seal to enable the annular seal to be positioned in the housing (12) with either one of two sides (50 or 52) of the annular seal (42) facing the ball end portion (26) of the movable member (24). The seal (42) includes an annular metal reinforcing ring (72) and an annular body (74) of polymeric material which encloses the metal reinforcing ring. The annular body (74) of polymeric material has a cylindrical outer side surface (62) which is disposed in sealing engagement with a cylindrical inner side surface (16) of the housing (12) and an inner side (52) disposed in sealing engagement with an outer side surface (28) of the ball end portion (26) of the movable member (24).

16 Claims, 2 Drawing Sheets

JOINT ASSEMBLY

BACKGROUND OF THE INVENTION

The present invention relates to a new and improved joint assembly, more specifically, to a joint assembly having a movable member with a ball end portion disposed in a housing.

Joint assemblies having movable members with ball end portions disposed in a housing commonly have a boot seal which is connected with the housing and a shank portion of the movable member. The boot seal is formed of a flexible material, such as neoprene or urethane. As the movable member oscillates and/or articulates, the boot seal flexes. To accommodate movement of the movable member, the boot seal has a very large profile which limits where the joint assembly may be installed in a vehicle and allows the seal to be exposed to road hazards which may puncture or otherwise damage the seal. In addition, as the boot seal is repeatedly flexed by relative movement between the movable member and the housing and is exposed to the environment, changes may occur in the properties of the material forming the seal.

SUMMARY OF THE INVENTION

The present invention relates to a new and improved joint assembly which includes a housing and a movable member having a ball end portion disposed in the housing. An annular seal is disposed in the housing. The seal includes a metal reinforcing ring and an annular body of polymeric material which encloses the metal reinforcing ring.

The body of polymeric material has an outer side surface which is disposed in sealing engagement with an inner side surface of the housing. The body of polymeric material also has an inner side surface which is disposed in sealing engagement with the ball end portion of the movable member.

The seal has bilateral symmetry about a central plane extending perpendicular to a central axis of the seal. The bilateral symmetry enables the seal to be positioned in the housing with either one of two sides of the seal facing the ball end portion of the movable member. Thus, the seal has axially inner and outer halves disposed on opposite sides of the central plane and having similar configurations. The inner and outer halves of the body of polymeric material may include radially inner sides having annular sealing ridges. The annular sealing ridges are formed by flat annular side surfaces and cylindrical side surfaces.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENT

Figure 1:
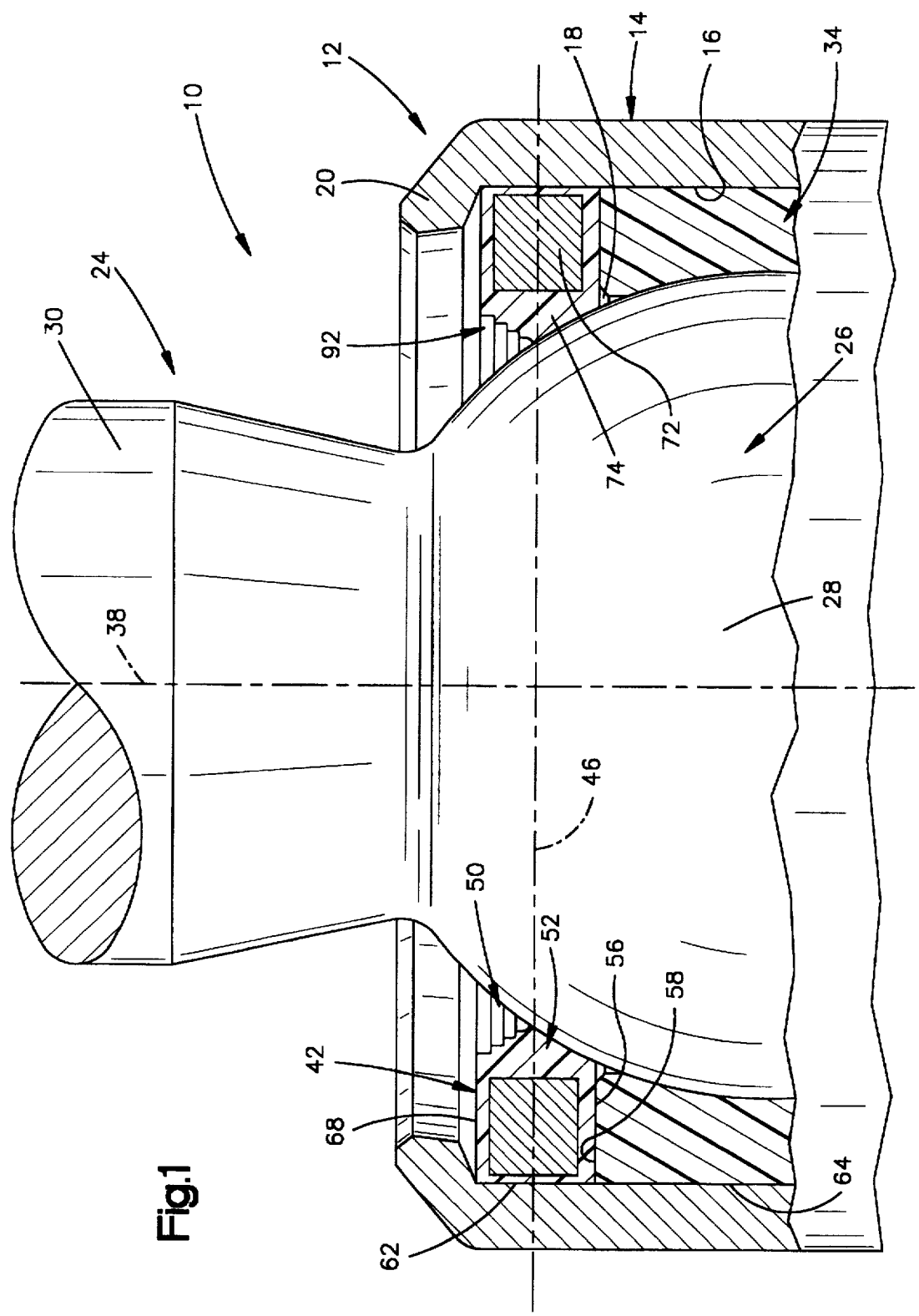
FIG. 1 is a fragmentary axial sectional view of a joint assembly having a seal constructed in accordance with the present invention.

A joint assembly 10 constructed in accordance with the present invention is illustrated in FIG. 1. The joint assembly 10 includes a metal housing 12. The metal housing 12 may be stamped from sheet metal or may be cast as one piece. The metal housing 12 has a cylindrical side wall 14 with a cylindrical inner side surface 16 which forms a socket chamber 18. An annular lip 20 is integrally formed with the side wall 14 and projects radially inward from the side wall 14.

A movable metal stud member 24 has a ball end portion 26 which is enclosed by the housing 12. The ball end portion 26 has an outer side surface 28 which is formed as a portion of a sphere. A shank portion 30 extends outward from the ball end portion 26. The shank portion 30 and ball end portion 26 are integrally formed as one piece.

A bearing seat 34 supports the ball end portion 26 of the movable stud member 24. The bearing seat 34 engages the outer side surface 28 of the ball end portion 26 of the movable stud member 24. The bearing seat 34 supports the ball end portion 26 of the movable stud member 24 for rotational movement about an axis 38.

In addition, the bearing seat 34 supports the movable stud member 24 for tilting movement from the initial position illustrated in FIG. 1. The bearing seat 34 supports the movable stud member 24 for tilting movement about a center of curvature of the ball end portion 26 of the movable stud member. The shank portion 30 of the movable stud member 24 can be tilted sideward in any direction within a 360° range from the position illustrated in FIG. 1. The bearing seat 34 is formed of a suitable polymeric material and cooperates with the ball end portion 26 of the movable stud member 24 in a known manner.

An annular seal 42 is constructed in accordance with the present invention. The seal 42 is enclosed by the side wall 14 of the housing 12. The annular seal 42 is disposed axially inward of the annular lip 20. The seal 42 is disposed in sealing engagement with the inner side surface 16 of the metal housing 12 and with the outer side surface 28 on the ball end portion 26 of the movable stud member 24.

Since the seal 42 is surrounded by the housing 12, it has a relatively small area of exposure to abrasion, puncture, or other types of damage by the environment around the joint assembly 10. Since the seal 42 is disposed in sealing engagement with the spherical ball end portion 26 of the movable stud member 24, the movable stud member can tilt through a large range of movement without stressing the seal. Since the seal 42 has minimal exposure to the environment around the joint assembly, the possibility of seal material variations caused by contaminants and other environmental factors are minimized.

The annular seal 42 has a non-circular cross-sectional configuration as viewed in an axial plane (FIG. 1). Thus, the seal 42 has a generally polygonal configuration when viewed in a plane which contains the coincident central axes 38 of the seal and the movable stud member 24. The central axis 38 of the seal 42 extends through the center of curvature of the ball end portion 26 of the movable stud member 24. Of course, the stud member 24 can be tilted so that its central axis is skewed relative to the central axis 38 of the seal 42.

The seal 42 has bilateral symmetry about a central or median plane 46. The central plane 46 extends perpendicular to the central axis 38 of the seal 42. Since the seal 42 has bilateral symmetry about the central plane 46, the seal can be positioned with either side of the seal disposed axially inward toward the ball end portion 26 of the movable stud member 24.

Figure 2:
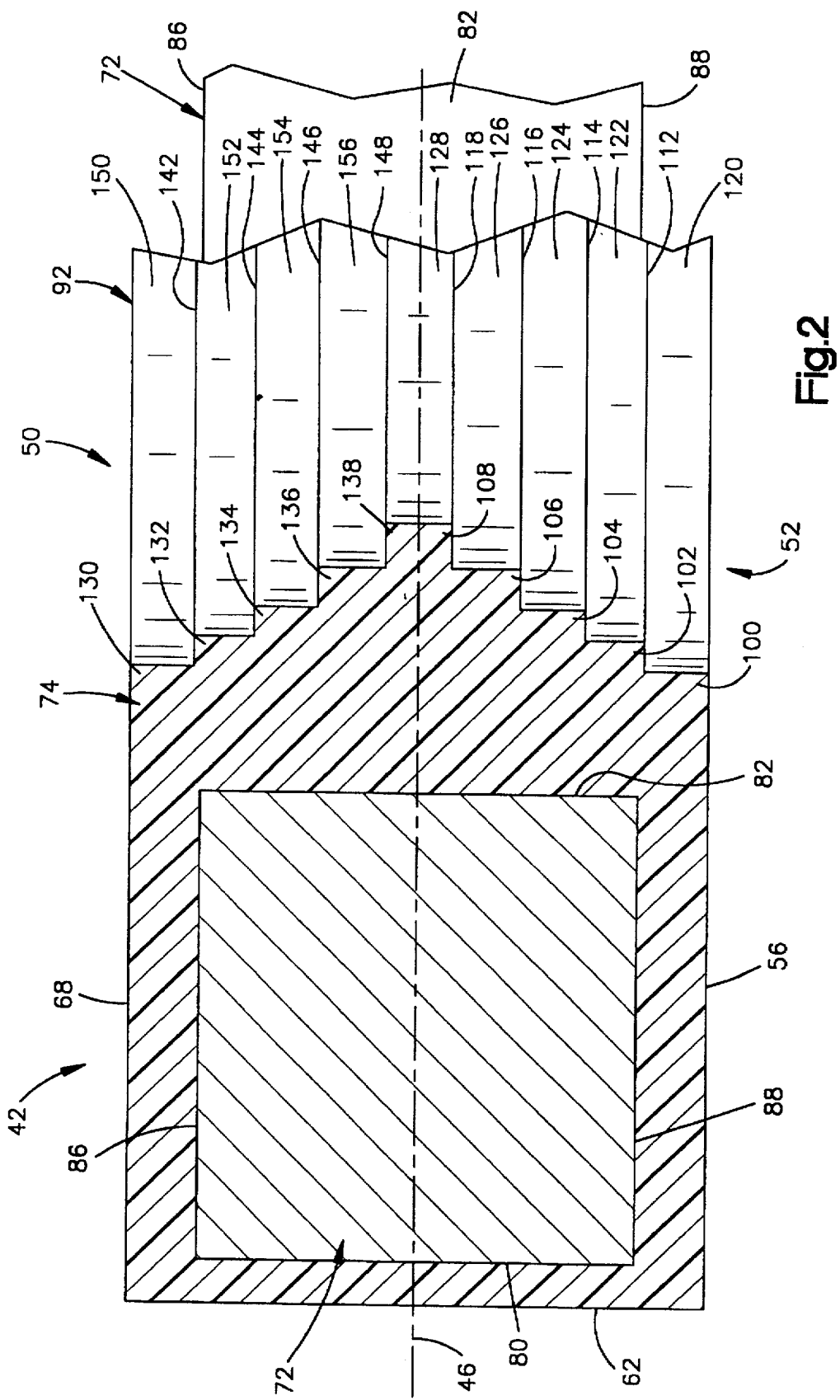
FIG. 2 is an enlarged illustration of a portion of the seal of FIG. 1 prior to installation of the seal in the joint assembly.

Thus, the seal 42 can be positioned with an upper (as viewed in FIG. 2) side or half 50 of the seal facing inward toward the ball end portion 26 of the movable stud member 24 (FIG. 1). The seal 42 can also be positioned with a lower (as viewed in FIG. 2) side or half 52 of the seal facing inward toward the ball end portion 26 of the movable stud member 24 (FIG. 1). This facilitates construction of the joint assembly 10.

The seal 42 has bilateral symmetry in that it is divided into an axially outer (FIG. 1) or upper (FIG. 2) half 50 and an axially inner (FIG. 1) or lower (FIG. 2) half 52 by the central or median plane 46. The upper and lower halves 50 and 52 (FIG. 2) are counterparts of each other. Thus, the upper half 50 of the seal 42 has a configuration which is a mirror image of the lower half 52 of the seal.

The seal 42 is disposed in sealing engagement with the bearing seat 34 (FIG. 1). Thus, the seal 42 has a flat annular inner or lower side surface 56 which is disposed in tight sealing engagement with a flat annular upper side surface 58 on the bearing seat 34. The flat annular inner side surface 56 of the seal 42 and the flat annular upper side surface 58 of the bearing seat 34 are coaxial with the central axis 38 of the seal.

A cylindrical radially outer side surface 62 of the seal 42 engages the cylindrical inner side surface 16 of the housing side wall 14. A fluid tight seal is obtained between the outer side surface 62 of the seal 42 and the inner side surface 16 of the housing side wall 14. In addition, a cylindrical radially outer side surface 64 of the bearing seat 34 is pressed firmly against the cylindrical inner side surface 16 of the housing side wall 14.

The annular lip 20 (FIG. 1) on the metal housing 12 presses the annular seal 42 axially inward against the bearing seat 34. In the embodiment of the joint assembly 10 illustrated in FIG. 1, the continuous annular housing lip 20 has minimal engagement with the annular seal 42. However, if desired, the annular housing lip 20 could be swaged or bent over to provide for abutting engagement between an inner side surface of the lip and the flat annular outer side surface 68 of the seal 42 throughout the extent of the lip. If desired, the housing lip 20 could have a different configuration. For example, the housing lip 20 could be formed by a plurality of segments which extend radially inward from the housing side wall 14.

The axially inner half 52 of the radially inner portion of the seal 42 sealingly engages the outer side surface 28 of the ball end portion 26 of the movable stud member 24. The seal 42 engages the ball end portion 26 of the stud member 24 at a location which is axially inward of the annular lip 20 and is almost, but not entirely, below or inward (as viewed in FIG. 1) of the central plane 46 about which the seal 42 has bilateral symmetry.

The seal 42 includes a metal reinforcing ring 72. The metal reinforcing ring 72 cooperates with the metal housing 12 to resist pullout of the movable stud member 24 from the socket chamber 18. The seal 42 also includes a body 74 of polymeric material. The body 74 of polymeric material encloses the metal reinforcing ring 72 and seals against the housing 12 and ball end portion 26 of the movable stud member 24.

The annular metal reinforcing ring 72 (FIG. 2) has a rectangular cross-sectional configuration as viewed in an axial plane containing the central axis 38 (FIG. 1) of the seal 42. The central plane 46 (FIG. 2) extends through the center of the rectangular cross-section of the metal reinforcing ring 72. Although the metal reinforcing ring 72 has been shown in FIG. 2 as having a square cross-sectional configuration, it is contemplated that the annular metal reinforcing ring 72 could have a different cross-sectional configuration.

The annular metal reinforcing ring 72 has a cylindrical radially outer side surface 80 (FIG. 2) with a central axis which is coincident with the central axis 38 of the seal 42. In addition, the annular metal reinforcing ring 72 has a cylindrical radially inner side surface 82 which is coaxial with the cylindrical radially outer side surface 80 of the reinforcing ring 72. When the seal 42 is installed in the housing 12 (FIG. 1), the cylindrical radially outer side surface 80 (FIG. 2) and the cylindrical radially inner side surface 82 of the reinforcing ring 72 are coaxial with the cylindrical inner side surface 16 of the housing side wall 14. The body 74 of polymeric material engages the ball end portion 26 of the movable stud member 24 at a location radially inward of the reinforcing ring 72.

The metal reinforcing ring 72 has a flat annular axially outer or upper side surface 86 which extends between the cylindrical radially outer and inner side surfaces 80 and 82 of the reinforcing ring. The reinforcing ring 72 also has a flat annular lower or inner side surface 88 which extends between the cylindrical radially outer and inner side surfaces 80 and 82. The flat annular upper and lower side surface 86 and 88 of the annular metal reinforcing ring 72 extend parallel to the central plane 46 and perpendicular to the central axis 38 (FIG. 1) of the seal 42. The central plane 46 is disposed half way between the parallel flat annular outer and inner side surfaces 86 and 88 on the metal reinforcing ring 72.

The body 74 (FIG. 2) of polymeric material encloses the reinforcing ring 72 and has bilateral symmetry about the central plane 46. The cylindrical radially outer side surface 62 and the body 74 of polymeric material is disposed in a coaxial relationship with the cylindrical radially outer side surface 80 of the reinforcing ring 72. As was previously mentioned, the cylindrical radially outer side surface 62 of the body 74 of polymeric material sealingly engages the inner side surface 16 (FIG. 1) of the metal housing 12.

The flat annular lower side surface 56 (FIG. 2) and the flat annular upper side surface 68 on the body 74 of polymeric material extend parallel to the flat annular upper side surface 86 and the flat annular lower side surface 88 of the reinforcing ring 72. In addition, the flat annular lower side surface 56 and the flat annular upper side surface 68 of the body 74 of polymeric material extend parallel to and are spaced equal distances from the central plane 46.

The body 74 of polymeric material has a radially inner portion 92 (FIG. 2) which sealingly engages the ball end portion 26 of the movable stud member 24. Upon installation of the seal 42 in the joint assembly 10, the radially inner portion 92 of the body 74 of polymeric material is resiliently deformed by engagement with the ball end portion 26 of the movable stud member 24. Assuming that the seal 42 is installed in the housing 12 with the lower half 52 of the seal facing axially inward, the lower half of the seal is resiliently compressed in a radially outward direction. Most of the upper half 50 of the seal 42 retains its original uncompressed configuration. However, there will be some resilient deformation of the upper half of the seal 42 adjacent to the central plane 46 and adjacent to the housing lip 20.

Prior to installation of the seal 42 in the joint assembly 10 (FIG. 2), the body 74 of polymeric material has bilateral symmetry about the central plane 46. Thus, the upper half 50 of the body 74 of polymeric material is a counterpart or mirror image of the lower half 52 of the body 74 of polymeric material, as viewed about the central plane 46. This enables the seal 42 to be positioned in the housing 12 with either side of the seal facing inward toward the ball end portion 26 of the movable stud member 24. Depending upon which way the seal 42 is installed in the housing 12, either the upper half 50 or the lower half 52 of the body 74 of polymeric material will have a fluid tight seal with the ball end portion of the movable stud member 24.

The axially lower half 52 (as viewed in FIG. 2) of the body 74 of polymeric material includes a plurality of annular seal ridges or corners 100, 102, 104, 106, and 108 having central axes with are coincident with the central axis 38 of the seal 42. When the seal 42 is installed in the housing 12 with the lower half 52 inward, as shown in FIG. 1, the annular ridges 100–108 are resiliently compressed to form a continuous fluid tight seal with the outer side surface 28 of the ball end portion 26 throughout the axial extent of the lower half 52 of the seal 42. This fluid tight seal is formed by the inner ridges or corners 100–108 even if the outer side surface 28 of the ball end portion 26 is not perfectly formed.

The lower half 52 of the radially inner portion 92 of the body 74 of polymeric material includes a plurality of flat parallel annular side surfaces 112, 114, 116, and 118. The side surfaces 112–118 have central axes which are coincident with the central axis 38 of the seal 42. A plurality of cylindrical side surfaces 120, 122, 124, and 128 intersect the flat annular side surfaces 112–118. The cylindrical side surfaces 120–128 have central axes which are coincident with the central axis 38 of the seal 42.

The cylindrical side surface 120 extends between the flat annular lower side surface 56 on the body 74 of polymeric material and the flat annular side surface 112 on the radially inner portion 92 of the body 74 of polymeric material. The cylindrical side surface 120 cooperates with the flat annular lower side surface 56 to form the ridge or corner 100.

Similarly, the cylindrical side surface 122 extends between the flat annular side surfaces 112 and 114. The cylindrical side surface 122 has a smaller diameter than the cylindrical side surface 120. The cylindrical side surface 122 cooperates with the flat annular side surface 112 to form the ridge or corner 102.

The cylindrical side surface 124 extends between the flat annular side surfaces 114 and 116. The cylindrical side surface 124 has a smaller diameter than the cylindrical side surface 122. The cylindrical side surface 124 cooperates with the flat annular side surface 114 to form the ridge or corner 104.

The cylindrical side surface 126 extends between the flat annular side surfaces 116 and 118. The cylindrical side surface 126 has a smaller diameter than the cylindrical side surface 124. The cylindrical side surface 126 cooperates with the flat annular side surface 116 to form the ridge or corner 106.

The cylindrical side surface 128 cooperates with the axially innermost flat annular side surface 118 to form the ridge or corner 108. The cylindrical side surface 128 has a smaller diameter than the cylindrical side surface 126.

The upper half 50 of the radially inner portion 92 of the body 74 of polymeric material has a configuration which is similar to or a mirror image of the configuration of the lower half 52 of the radially inner portion 92 of the body 74 of polymeric material. Thus, the upper half 50 of the radially inner portion 92 of the body 74 of polymeric material includes a plurality of annular ridges or corners 130, 132, 134, 136, and 138. The annular ridges 130–138 have central axes which are coincident with the central axis 38 of the bearing 42.

If the seal 42 is installed in the housing 12 with the upper half 50 inward, that is in orientation which is offset by 180° from the orientation shown in FIG. 1, the annular ridges or corners 130–138 on the upper half 50 of the seal 42 are pressed into engagement with the outer side surface 28 of the ball end portion 26 of the movable stud member 24. The axial pressure applied against the seal 42 by the lip 20 will result in resilient deformation of the annular ridges or corners 130–138. Therefore, a continuous fluid tight seal is obtained between the upper half 50 of the seal 42 and the outer side surface 28 of the ball end portion 26 of the movable stud member 24 even if the outer side surface 28 of the ball end portion 26 is imperfectly formed.

The upper half 50 of the radially inner portion 92 of the body 74 of polymeric material includes a plurality of flat parallel annular side surfaces 142, 144, 146, and 148 having central axes which are coincident with the central axis 38 of the seal 42. The flat annular side surfaces 142–148 are disposed in planes which extend parallel to the flat annular upper or outer side surface 68 of the body 74 of polymeric material and to the central plane 46.

A plurality of cylindrical side surfaces 150, 152, 154, and 156 extend between and intersect the flat annular side surfaces 142–148. Thus, the cylindrical side surface 150 extends between the flat annular outer surface 68 and the flat annular side surface 142. The cylindrical side surface 150 cooperates with the flat annular outer side surface 68 to form the ridge or corner 130.

The cylindrical side surface 152 extends between the flat annular side surfaces 142 and 144. The cylindrical side surface 152 has a diameter which is smaller than the diameter of the cylindrical side surface 150. The cylindrical side surface 152 cooperates with the flat annular side surface 142 to form the annular ridge or corner 132.

The cylindrical side surface 154 extends between the flat annular side surfaces 144 and 146. The cylindrical side surface 154 has a diameter which is less than the diameter of the cylindrical side surface 152. The cylindrical side surface 154 cooperates with the flat annular side surface 144 to form the annular ridge or corner 134.

The cylindrical side surface 156 extends between the flat annular side surfaces 146 and 148. The cylindrical side surface 156 has a diameter which is less than the diameter of the cylindrical side surface 154. The cylindrical side surface 156 cooperates with the flat annular side surface 146 to form the annular ridge or corner 136.

The cylindrical side surface 128 extends between the flat annular side surfaces 118 and 148. The cylindrical side surface 128 is disposed midway between the flat annular lower side surface 56 and the flat annular upper side surface 68 of the body 74 of polymeric material. The central plane 46 extends through the cylindrical side surface 128 at a location half way between the parallel flat annular side surfaces 118 and 148. The cylindrical side surface 128 cooperates with the flat annular side surfaces 118 and 148 to form the annular ridges or corners 108 and 138.

For each of the flat annular side surfaces 112–118 on the lower half 52 of the body 74 of polymeric material, there is a corresponding flat annular side surface 142–148 on the upper half 50 of the body 74 of polymeric material. Thus, the flat annular side surface 112 on the body 74 of polymeric material extends parallel to and is the same size as the flat annular side surface 142 on the body 74 of polymeric material. Similarly, the flat annular side surfaces 114 and 144 extend parallel to each other and are the same size. In addition, the flat annular side surfaces 116 and 146 extend parallel to each other and are the same size. Finally, the flat annular side surfaces 118 and 148 extend parallel to each other and are the same size.

For each of the cylindrical side surfaces 120–126 on the lower half 52 of the body 74 of polymeric material, there is a corresponding cylindrical side surface on the upper half 50 of the body 74 of polymeric material. Thus, the cylindrical side surfaces 120 and 150 have the same diameter and axial extent. The cylindrical side surfaces 122 and 152 have the same diameter and axial extent. In addition, the cylindrical side surfaces 124 and 154 have the same diameter and the same axial extent. Finally, the cylindrical side surfaces 126 and 156 have the same diameter and axial extent.

From the above description of the invention, those skilled in the art will perceive improvements, changes and modifications. Such improvements, changes and modifications within the skill of the art are intended to be covered by the appended claims.

Having described the invention, the following is claimed:

1. A joint assembly comprising:
   a housing;
   a movable member having a ball end portion disposed in said housing; and
   a continuous annular seal disposed between an inner side surface of said housing and said ball end portion of said movable member, said annular seal engaging said inner side surface of said housing and said ball end portion of said movable member, said annular seal having a non-circular cross-sectional configuration in an axial plane containing a central axis of said annular seal and on one side of the central axis, said annular seal having bilateral symmetry about a central plane extending perpendicular to the central axis of said annular seal to enable the annular seal to be positioned in said housing with either one of two sides of said annular seal facing said ball end portion of said movable member.

2. A joint assembly as set forth in claim 1 wherein said annular seal has a first half which is disposed on an inner side of the central plane extending perpendicular to the central axis of said annular seal and a second half which is disposed on an outer side of the central plane extending perpendicular to the central axis of said annular seal, said first and second halves of said annular seal having similar configurations.

3. A joint assembly as set forth in claim 2 wherein said first half of said annular seal includes a first flat annular side surface which is disposed in first plane extending parallel to the central plane, said second half of said annular seal includes a second flat annular side surface which is disposed in a second plane extending parallel to the first plane.

4. A joint assembly as set forth in claim 3 wherein said annular seal further includes a cylindrical side surface which extends between said first and second flat annular side surfaces.

5. A joint assembly as set forth in claim 3 wherein said first half of said annular seal includes a third flat annular side surface which is disposed in a third plane extending parallel to the central plane and a first cylindrical side surface which extends between said first and third annular side surfaces, said second half of said annular seal includes a fourth flat annular side surface which is disposed in a fourth plane extending parallel to the central plane and a second cylindrical side surface which extends between said second and fourth annular side surfaces.

6. A joint assembly as set forth in claim 5 wherein said seal includes an annular metal reinforcing ring which is enclosed by a body of polymeric material, said first, second, third, and fourth flat annular side surfaces and said first and second cylindrical side surfaces being disposed on said body of polymeric material.

7. A joint assembly as set forth in claim 6 wherein said annular metal reinforcing ring includes a first flat annular side surface which is disposed in a fifth plane extending parallel to the central plane and which extends through said first half of said annular seal, said metal reinforcing ring having a second flat annular side surface which is disposed in a sixth plane extending parallel to the central plane and which extends through said second half of said annular seal.

8. A joint assembly as set forth in claim 7 wherein said annular metal reinforcing ring includes a first cylindrical side surface which extends between said first and second flat annular side surfaces on said annular metal reinforcing ring and a second cylindrical side surface which extends between said first and second flat annular side surfaces on said annular metal reinforcing ring, said first cylindrical side surface on said metal reinforcing ring having a diameter which is less than the diameter of said second cylindrical side surface on said metal reinforcing ring.

9. A joint assembly as set forth in claim 5 wherein said first cylindrical side surface of said first half of said annular seal and said second cylindrical side surface of said second half of said annular seal are disposed on a radially inner portion of said annular seal.

10. A joint assembly as set forth in claim 1 wherein said housing includes a generally cylindrical side wall and a lip which projects radially inward from said cylindrical side wall, said annular seal including an annular metal reinforcing ring and an annular body of polymeric material which encloses said annular metal reinforcing ring, said annular body of polymeric material being entirely disposed radially inward of said cylindrical side wall and axially inward of said lip of said housing, said annular body of polymeric material being disposed in engagement with an outer surface area disposed on said ball end portion of said movable member, said outer surface area on said ball end portion of said movable member forms a portion of a sphere, said outer surface area on said ball end portion of said movable member being at least partially disposed radially inward of said cylindrical side wall and axially inward of said lip, said movable member being tiltable about a center disposed on the central axis of said annular seal at the center of curvature of said outer surface area disposed on said ball end portion of said movable member.

11. A joint assembly as set forth in claim 10 further including a bearing seat which is disposed radially inward of said cylindrical side wall of said housing and axially inward of said annular seal, said bearing seat having a circular end surface which is disposed in sealing engagement with said body of polymeric material of said annular seal, said bearing seat having an inner side surface area which is disposed in engagement with said outer surface area on said ball end portion of said movable member.

12. A joint assembly comprising:
   a housing having a side wall with a cylindrical inner side surface area and a lip which projects radially inward of said cylindrical inner side surface area;
   a movable member having a ball end portion disposed in said housing; and
   an annular seal disposed in said housing and having an axial length extending from an outer surface to an inner surface, said annular seal including an annular metal reinforcing ring and an annular body of polymeric material which encloses said annular metal reinforcing ring, said annular body of polymeric material having a cylindrical outer side surface extending substantially over said axial length of said annular seal which is disposed in sealing engagement with said cylindrical inner side surface area on said housing and an inner side surface disposed in sealing engagement with an outer surface area disposed on said ball end portion of said movable member at a location radially inward of said annular metal reinforcing ring and axially inward of said lip.

13. A joint assembly as set forth in claim 12 wherein said annular metal reinforcing ring has a rectangular cross-sectional configuration in an axial plane containing a central axis of said annular seal.

14. A joint assembly as set forth in claim 12 wherein said annular metal reinforcing ring has a cylindrical outer side surface, a cylindrical inner side surface, an axially outer flat annular side surface area which is disposed in a plane extending perpendicular to coincident central axes of said cylindrical inner and outer side surfaces, and an axially inner flat annular side surface area which is disposed in a plane extending perpendicular to the coincident central axes of said cylindrical inner and outer side surfaces, said annular body of polymeric material having a first flat annular side surface area with an outer diameter which is less than a diameter of the cylindrical inner side surface of said annular metal reinforcing ring, a second flat annular side surface area with an outer diameter which is less than the outer diameter of said first flat annular side surface area, a first cylindrical side surface area which extends between said first flat annular side surface area and said second flat annular side surface area, a third flat annular side surface area with an outer diameter which is the same as the outer diameter of said first flat annular side surface area, a fourth flat annular side surface area with an outer diameter which is the same as the outer diameter of said second flat annular side surface area, and a second cylindrical side surface area which extends between said third flat annular side surface area and said fourth flat annular side surface area and has a diameter which is the same as a diameter of said first cylindrical side surface area.

15. A joint assembly as set forth in claim 14 wherein said first, second, third, and fourth flat annular side surface areas and said first and second cylindrical side surface areas on said annular body of polymeric material are disposed between planes containing said axially outer and axially inner side surfaces of said annular metal reinforcing ring.

16. A joint assembly comprising:

a housing having a side wall with a cylindrical inner side surface area and a lip which projects radially inward of said cylindrical inner side surface area;

a movable member having a ball end portion disposed in said housing; and an annular seal disposed in said housing, said annular seal including an annular metal reinforcing ring and an annular body of polymeric material which encloses said annular metal reinforcing ring, said annular body of polymeric material having a cylindrical outer side surface extending substantially over an axial length of said annular seal which is disposed in sealing engagement with said cylindrical inner side surface area on said housing and an inner side surface disposed in sealing engagement with an outer surface area disposed on said ball end portion of said movable member at a location radially inward of said annular metal reinforcing ring and axially inward of said lip, said annular seal having bilateral symmetry about a central plane extending perpendicular to the central axis of said annular seal to enable said annular seal to be positioned in said housing with either one of two sides of said annular seal facing said ball end portion of said movable member.

* * * * *